US012332603B2

(12) United States Patent
Vannod et al.

(10) Patent No.: US 12,332,603 B2
(45) Date of Patent: Jun. 17, 2025

(54) TIMEPIECE ASSEMBLY AND METHOD FOR MANUFACTURING THE SAME

(71) Applicant: Nivarox-FAR S.A., Le Locle (CH)

(72) Inventors: Jonas Vannod, Bienne (CH); Christian Charbon, Chézard-St-Martin (CH)

(73) Assignee: Nivarox-FAR S.A., Le Locle (CH)

( * ) Notice: Subject to any disclaimer, the term of this patent is extended or adjusted under 35 U.S.C. 154(b) by 830 days.

(21) Appl. No.: 17/379,127

(22) Filed: Jul. 19, 2021

(65) Prior Publication Data

US 2022/0075322 A1 Mar. 10, 2022

(30) Foreign Application Priority Data

Sep. 9, 2020 (EP) ..................................... 20195332

(51) Int. Cl.
*G04B 31/06* (2006.01)
*G04B 18/00* (2006.01)

(52) U.S. Cl.
CPC ........... *G04B 31/06* (2013.01); *G04B 18/006* (2013.01)

(58) Field of Classification Search
CPC .............................. G04B 31/06; G04B 18/006
See application file for complete search history.

(56) References Cited

U.S. PATENT DOCUMENTS 8,944,675 B2 * 2/2015 Mallet .................. G04B 17/063 368/171
10,061,269 B2 * 8/2018 Graf ....................... G04B 18/06
10,372,083 B2 * 8/2019 Tobenas Borron ..... C23C 16/34
2003/0224201 A1 * 12/2003 Kawakami .............. C23C 14/16 420/512
2010/0110840 A1 5/2010 Zaugg et al.
2011/0199866 A1 8/2011 Zaugg et al.
2017/0068219 A1 3/2017 Dubois
2017/0146954 A1 * 5/2017 Charbon .............. G04B 31/012
2017/0176944 A1 6/2017 Vuille
2018/0024501 A1 * 1/2018 Fussinger ............ G04B 13/022 368/322
2019/0049900 A1 * 2/2019 Bucaille ................. G04B 17/26
2019/0338425 A1 11/2019 McGill et al.

FOREIGN PATENT DOCUMENTS

CH 248 536 A 5/1947
CH 621 667 A 2/1981
CH 699 882 A2 5/2010
CH 703 462 A2 1/2012
(Continued)

OTHER PUBLICATIONS

Machine translation of Niida (JP 2017161287 A), original provided by the Applicant (Year: 2024).*
(Continued)

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

A timepiece assembly including a first component and a second component assembled under stress, wherein at least one part of the surface of the assembly is coated with a protective layer intended to cover defects such as cracks or incipient cracks after assembly. It also relates to the method for manufacturing this assembly.

15 Claims, 2 Drawing Sheets

(56) References Cited

FOREIGN PATENT DOCUMENTS

| | | | |
|---|---|---|---|
| CH | 705 238 | A2 | 1/2013 |
| CH | 706 915 | A2 | 3/2014 |
| CH | 712 711 | A2 | 1/2018 |
| CH | 713 329 | A1 | 6/2018 |
| CN | 101978327 | A | 2/2011 |
| CN | 111308878 | A | 6/2020 |
| EP | 3 185 086 | A1 | 6/2017 |
| EP | 3 456 859 | A1 | 3/2019 |
| JP | 2017-161287 | A | 9/2017 |
| WO | WO 2015/011637 | A2 | 1/2015 |

OTHER PUBLICATIONS

Russian Office Action issued Mar. 30, 2022 in Russian Patent Application No. 2021122499/28(047032) (with English language translation), 12 pages.

Office Action issued Jun. 30, 2022, in corresponding Russian Patent Application No. 2021122499/28(047032) (with English Translation), 12 pages.

European Search Report issued Mar. 22, 2021 in European Application 20195332.0, filed on Sep. 9, 2020 (with English Translation of Categories of cited documents), 3 pages.

Chinese Office Action and Search Report issued Dec. 26, 2022 in Chinese Application 202111055595.7, (with English Translation of Categories of Cited Documents), 11 pages.

* cited by examiner

TIMEPIECE ASSEMBLY AND METHOD FOR MANUFACTURING THE SAME

CROSS-REFERENCE TO RELATED APPLICATION

This application claims priority to European Patent Application No. 20195332.0 filed on Sep. 9, 2020, the entire disclosure of which is hereby incorporated herein by reference.

FIELD OF THE INVENTION

The invention relates to a timepiece assembly comprising two components, in particular a balance and an inertia screw, assembled under stress. It also relates to the method for manufacturing said assembly.

BACKGROUND OF THE INVENTION

There are many known constructions of balances with means for adjusting the inertia and/or poising of the balance. In particular, there are known balances with inertia blocks, also called inertia screws, which are screwed or driven into arrangements in the felloe of a balance. Some embodiments have attempted to ensure the retention of inertia screws by clamping. Thus, CH Patent No. 705238 discloses a balance comprising at least one slot for receiving and clamping in position a shaft of an inertia screw, the slot being delimited, on the one hand, by a rigid part of the balance, and, on the other hand, by a resilient arm permanently biased towards said rigid part of the balance delimiting the slot in order to hold the screw. When the inertia screws are inserted, the resilient arm undergoes significant deformation as a result of being moved. This deformation can then generate defects in the material, such as cracks or incipient cracks. It can also generate defects in the protective layer that covers the balance. The purpose of this layer is to provide a particular appearance and to improve the resistance of balances to tarnishing and corrosion. This is usually a gilded layer with a nickel sublayer, to combine aesthetic appearance with corrosion resistance properties. Assembling inertia blocks on the balance will generate defects in this protective layer in areas stressed during the deformation of the arm and in bearing or gripping areas where the layer may be locally damaged. The protective layer is then no longer impermeable to aggressive substances such as ammonia or chlorine, which can cause stress corrosion of the underlying material.

SUMMARY OF THE INVENTION

It is an object of the invention to overcome the aforecited drawbacks by proposing a method for manufacturing a timepiece assembly comprising two components assembled under stress, such as the balance/inertia screw pair, including a step of depositing a protective layer subsequent to the step of assembling the two components.

This layer can essentially consist of $SiO_2$, $Al_2O_3$, Rh, Au, Ni or NiP or a stack of several layers of these materials.

The addition of this layer after assembly strengthens the barrier effect of the layer deposited before assembly, in particular in the areas that might be damaged during assembly. This protective layer deposited after assembly ensures the absence of surface defects due to assembly on the finished product. It fills potential cracks or incipient cracks, which prevents contact between the aggressive environment and the underlying material.

The protective layer has a thickness comprised between 20 nm and 3 μm, and preferably between 100 nm and 500 nm. This thin thickness makes it possible to avoid welding the inertia screw to the balance, which would have an impact on the adjustment functionality of the inertia screws.

The present invention also relates to the timepiece assembly comprising a first component and a second component assembled under stress, with at least one part of the surface of the timepiece assembly coated with the protective layer intended to cover defects at the end of the assembly process.

BRIEF DESCRIPTION OF THE DRAWINGS

Other features and advantages will appear clearly from the following description, given by way of non-limiting illustration, with reference to the annexed drawings.

DESCRIPTION OF THE INVENTION

Figure 1:
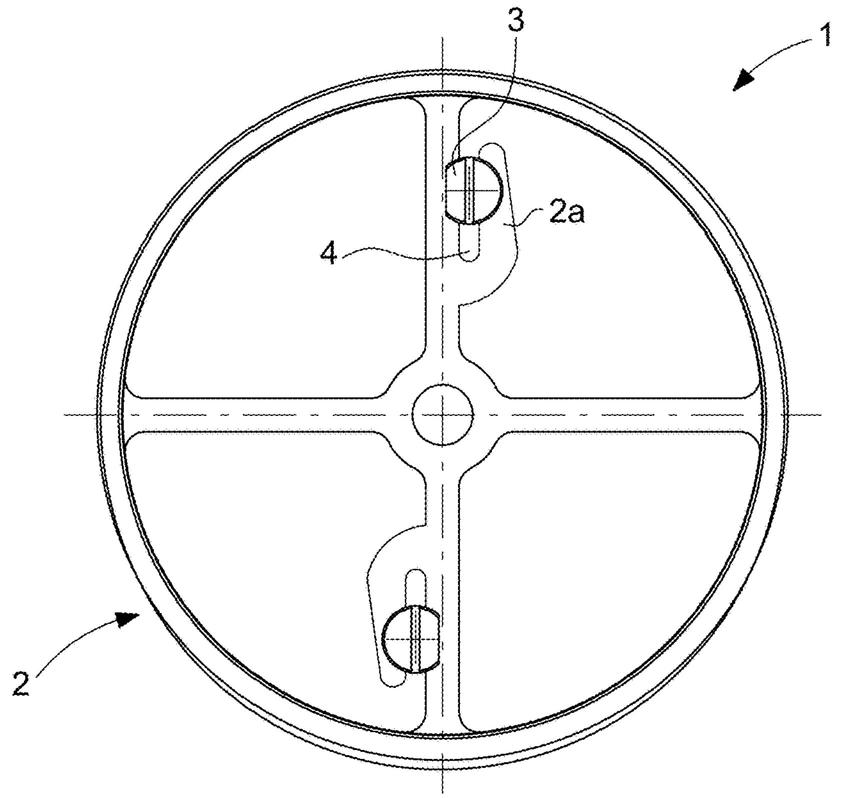
FIG. 1 is a plan view of the timepiece assembly according to the invention comprising the balance and two inertia screws.
Figure 2:
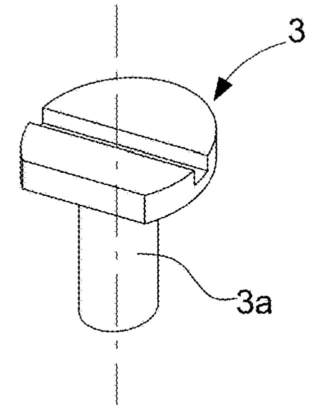
FIG. 2 is a three-dimensional view of the inertia screw of the timepiece assembly of FIG. 1.

The invention relates to a timepiece assembly comprising at least two components assembled under stress. By way of example, as represented in FIG. 1, the first component is a balance 2 comprising a resilient arm 2*a* delimiting a slot 4 which, during assembly, receives the second component which is an inertia screw 3 also visible in FIG. 2. This could also be a pressed-in element, like an impulse pin in a roller or a balance on a staff, etc.

The components can be made of a material chosen from the list including copper, copper alloys such as brass or nickel silver, aluminium, aluminium alloys, titanium, titanium alloys, carbon steel and ferritic and austenitic stainless steels.

Figure 4A:
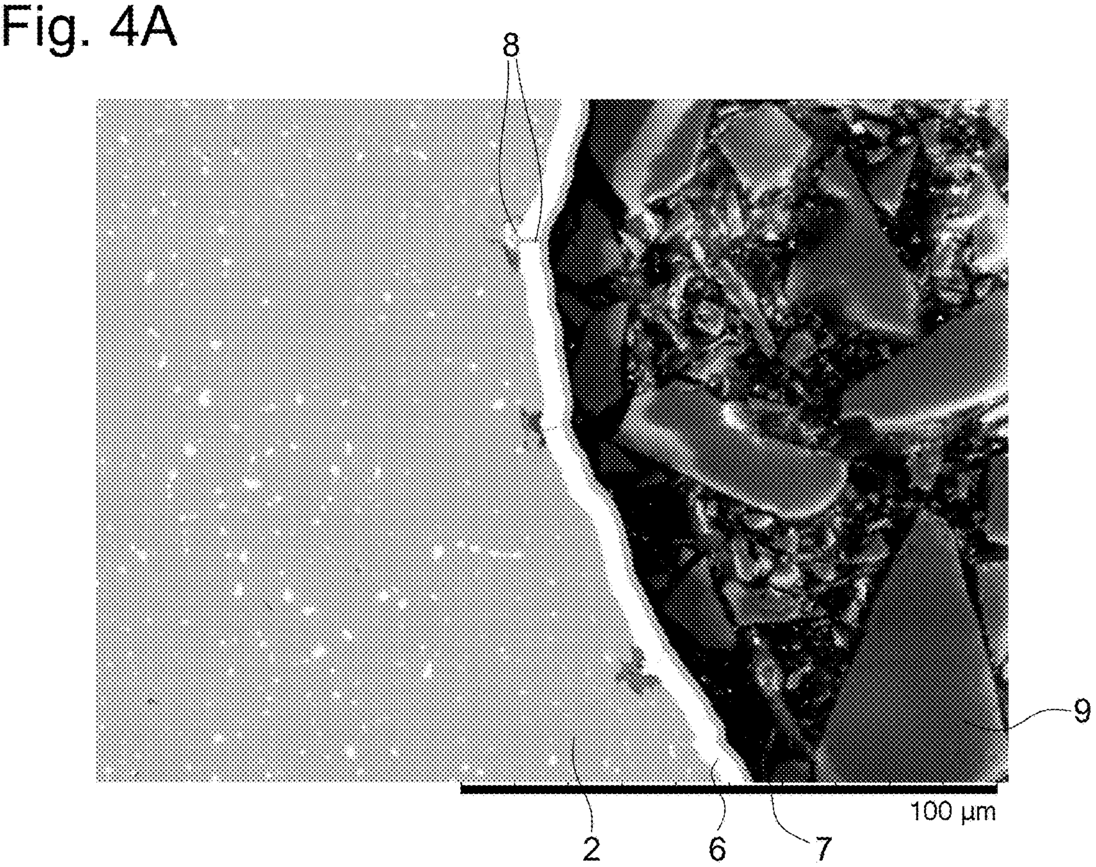
FIG. 4A is an electron microscope view of a cross-section of the balance of the timepiece assembly according to the invention.
Figure 4B:
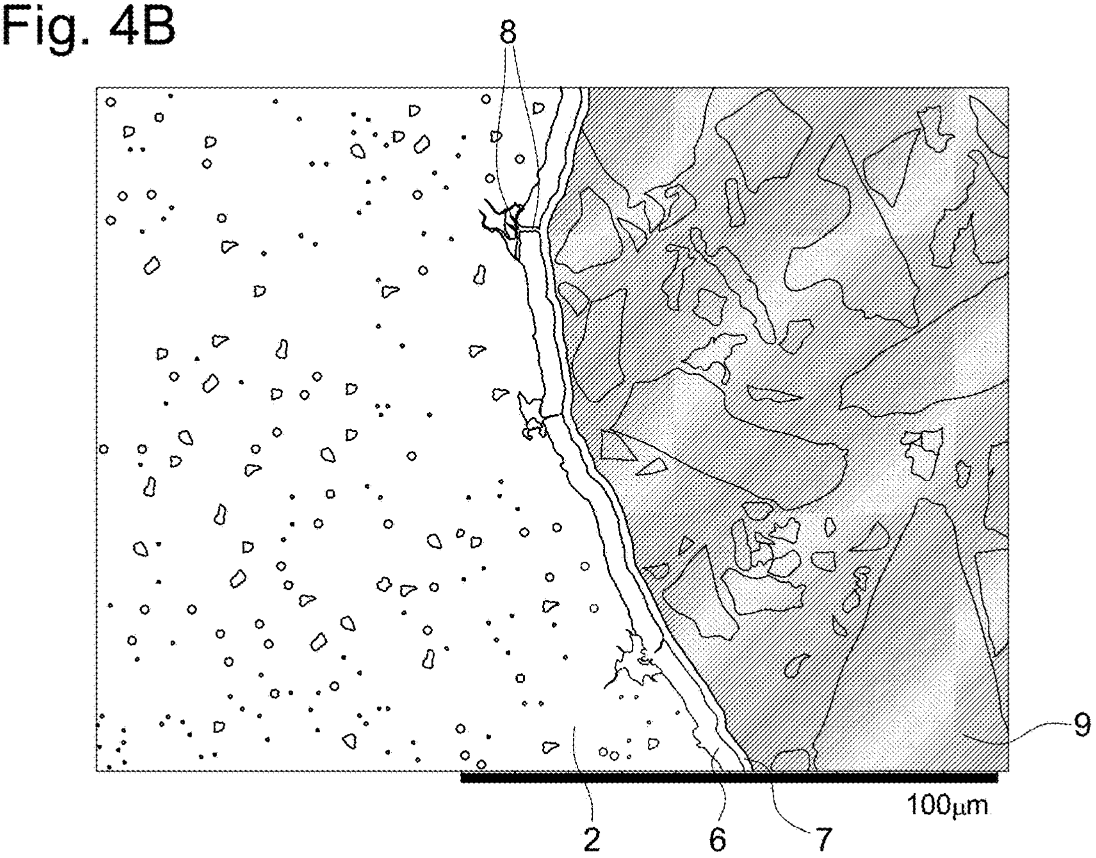
FIG. 4B is a schematic diagram of FIG. 4A.

According to the invention, the timepiece assembly is at least partially coated with a protective layer after assembly, intended to cover any defects such as cracks, incipient cracks, peeling, resulting from the assembly process or possibly already present prior to assembly. FIGS. 4A and 4B respectively represent, in an electron microscope view and a schematic view of said electron microscope view, the formation of cracks 8 in the base material of one of the components (referenced 2) and in a protective layer, called first layer 6, deposited prior to assembly. According to the invention, a protective layer 7, called the second layer, is deposited on the cracked surface to form a barrier impermeable to the external environment after assembly.

Figure 3:
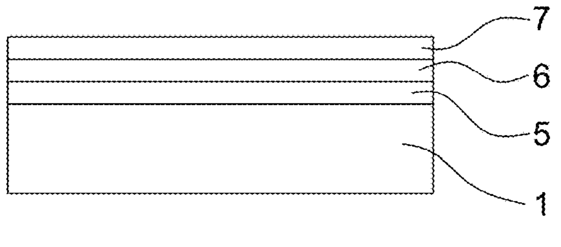
FIG. 3 is a schematic cross-sectional view of a component of the timepiece assembly coated with several layers according to the method of the invention.

FIG. 3 schematically represents the layers deposited on timepiece assembly 1. Prior to assembly, one or more layers can optionally be deposited on at least one of the two components of the timepiece assembly. The base material of the timepiece assembly can thus be coated with a first layer 6 and, also optionally, with a sublayer 5 underneath first layer 6. First layer 6 may comprise rhodium or pure gold or gold comprising traces of elements such as cobalt or nickel, and sublayer 5 can comprise nickel, such as NiP or pure electroplated Ni, or pure gold or gold with trace elements.

The first layer has a thickness comprised between 100 nm and 2 μm, and the sublayer has a thickness comprised between 100 nm and 2 μm.

Protective layer 7, which is more particularly the subject of the invention, is a barrier layer deposited after assembly. This layer is formed of a single layer or of a stack of layers. Each layer respectively comprises $SiO_2$, $Al_2O_3$, Rh, Au, Ni or NiP with low P (2-4% by weight), medium P (5-9% by weight) or high P (10-13% weight). Preferably, each layer respectively consists of $SiO_2$, $Al_2O_3$, Rh, Au, Ni or NiP with low P (2-4% by weight), medium P (5-9% by weight) or high P (10-13% weight). The protective layer has a thickness comprised between 20 nm and 3 μm, and preferably between 100 nm and 500 nm. For the variant with a stack of layers, all the layers have a thickness comprised between 20 nm and 3 μm, preferably between 100 nm and 500 nm.

According to the invention, at least one part of the surface of the assembly is coated with the protective layer intended to cover defects at the end of the assembly process. Advantageously, at least the surface of the component subjected to deformation during assembly is coated. Preferably, the entire external surface of the timepiece assembly is coated with the protective layer.

Protective layer 7 deposited after assembly is thus devoid of defects and more particularly of cracks and incipient cracks.

The present invention also relates to the method of manufacturing the timepiece assembly including the following steps:

a) Providing the first component and the second component, b) Assembling the first component and the second component under stress, c) Depositing protective layer 7, also called the second layer, on at least one part of the surface of the assembly comprising the first component and the second component.

According to the invention, the protective layer is deposited by ALD (Atomic Layer Deposition), PVD (Physical Vapour Deposition), CVD (Chemical Vapour Deposition), chemical or electroplating deposition.

The method may also comprise a step a') of depositing first layer 6 on at least one part of the first component and/or of the second component prior to assembly step b).

The method may also include a step a") of depositing sublayer 5 on said at least one part of the first component and/or of the second component prior to step a').

The sublayer and the first layer can also be deposited by ALD, PVD, CVD, chemical or electroplating deposition.

The method may also include a heat treatment step a"') intended to improve the adherence of the first layer and the sublayer if these latter are present. This step occurs prior to assembly step b). The heat treatment is carried out between 150 and 300° C. for 30 minutes to 5 hours. In a variant, the method includes a step d) of this same heat treatment after step c) of depositing the protective layer. According to another variant, the method includes a step a"') of this heat treatment prior to assembly step b) and a step d) of this heat treatment after step c) of depositing the protective layer.

KEY (1) Timepiece assembly
(2) Balance
 a. Resilient arm
(3) Inertia screw
 a. Shaft
(4) Slot
(5) Sublayer deposited prior to assembly
(6) Layer deposited prior to assembly, also called the first layer
(7) Layer deposited after assembly, also called the protective layer or second layer
(8) Crack or incipient crack
(9) Coating material of the sample seen in an electron microscope view

The invention claimed is:

1. A method for manufacturing a timepiece assembly, the method comprising, successively:

assembling an inertia screw to a balance, the balance comprising a resilient arm delimiting a slot configured to receive the inertia screw, under mechanical stress by elastic deformation of the resilient arm and insertion of the inertia screw into the slot, to obtain a component assembly; and depositing, under stress on the resilient arm, a protective layer on at least one part of a surface of a stressed area of the component assembly configured for the timepiece assembly, wherein the timepiece assembly comprises the balance comprising the resilient arm delimiting the slot; and the inertia screw assembled under mechanical stress, and wherein the slot is configured to receive the inertia screw.

2. The method of claim 1, further comprising, prior to the assembling:

depositing a first layer at least partially on the balance and/or the inertia screw.

3. The method of claim 2, further comprising, prior to the depositing of the first layer:

depositing a sub-layer at least partially on the balance and/or the inertia screw.

4. The method of claim 3, wherein the first layer and the sub-layer are deposited by ALD, PVD, CVD, chemical deposition, or electroplating deposition.

5. The method of claim 3, wherein the sublayer comprises Ni or Au.

6. The method of claim 3, wherein the sub-layer has a thickness in a range of from 100 nm to 2 μm.

7. The method of claim 2, further comprising, before the assembling and after the depositing of the first layer:

heat treating the first layer at a temperature in a range of from 150 to 300° C. for a time in a range of from 30 minutes to 5 hours.

8. The method of claim 2, wherein the first layer comprises Au or Rh.

9. The method of claim 2, wherein the first layer has a thickness in a range of from 100 nm to 2 μm.

10. The method of claim 1, further comprising, after the depositing of the protective layer:

heat treating the protective layer at a temperature in a range of from 150 to 300° C. for a time in a range of from 30 minutes to 5 hours.

11. The method of claim 10, wherein the protective layer is deposited by ALD, PVD, CVD, chemical deposition, or electroplating deposition.

12. The method of claim 1, wherein the protective layer comprises $SiO_2$, $Al_2O_3$, Rh, Au, Ni, or NiP.

13. The method of claim 1, wherein the protective layer is formed of a stack of layers respectively comprising $SiO_2$, $Al_2O_3$, Rh, Au, Ni, or NiP.

14. The method of claim 1, wherein the protective layer has a thickness in a range of from 20 nm to 3 μm.

15. A method for manufacturing a timepiece assembly, the method comprising, successively:

assembling a first component and a second component under mechanical stress; and depositing, under stress on the first component, a protective layer at least partially on a surface in an area stressed of a first assembly comprising the first component and the second component, wherein the timepiece assembly comprises the first component and the second component, assembled under mechanical stress, wherein the first component is an element assembled by press fit onto the second component, and wherein (i) the first component is an impulse pin and the second component is a roller or (ii) wherein the first component is a balance and the second component is a shaft.

* * * * *